US008860573B2

(12) United States Patent
Hart et al.

(10) Patent No.: US 8,860,573 B2
(45) Date of Patent: Oct. 14, 2014

(54) ALARM SYSTEM

(75) Inventors: Stuart Arthur Hart, London (GB); Nicholas Alexander Rutter, London (GB)

(73) Assignee: Fireangel Limited (GB)

( * ) Notice: Subject to any disclaimer, the term of this patent is extended or adjusted under 35 U.S.C. 154(b) by 1412 days.

(21) Appl. No.: 12/281,673

(22) PCT Filed: Mar. 6, 2007

(86) PCT No.: PCT/GB2007/000761
§ 371 (c)(1), (2), (4) Date: Aug. 24, 2010

(87) PCT Pub. No.: WO2007/101984
PCT Pub. Date: Sep. 13, 2007

(65) Prior Publication Data

US 2011/0121968 A1 May 26, 2011

(30) Foreign Application Priority Data

Mar. 6, 2006 (GB) .................................. 0604336.8

(51) Int. Cl.

| | |
|---|---|
| ***G08B 21/00*** | (2006.01) |
| ***G08B 17/00*** | (2006.01) |
| ***G08B 17/10*** | (2006.01) |
| ***H04M 11/04*** | (2006.01) |
| ***G08B 7/06*** | (2006.01) |
| ***G08B 29/14*** | (2006.01) |
| ***G08B 25/10*** | (2006.01) |

(52) U.S. Cl.
CPC *G08B 25/10* (2013.01); *G08B 7/06* (2013.01); *G08B 29/145* (2013.01)
USPC ......... 340/540; 340/286.05; 340/632; 379/43

(58) Field of Classification Search
None
See application file for complete search history.

(56) References Cited

U.S. PATENT DOCUMENTS 4,179,751 A * 12/1979 Adachi ......................... 365/228
4,617,561 A 10/1986 Brown (Continued)

FOREIGN PATENT DOCUMENTS

GB 867 342 A 5/1961
GB 2380041 A 3/2003

(Continued)

OTHER PUBLICATIONS

English Translation of JP Office Action of Jan. 31, 2012 in JP2008-557819.

(Continued)

*Primary Examiner* — George Bugg
*Assistant Examiner* — Renee Dorsey
(74) *Attorney, Agent, or Firm* — Young Law Firm, P.C.

(57) ABSTRACT

The present invention is an alarm system comprising an alarm handset (10) having a housing (30), a detector circuit (100) having means (102, 104) for receiving a preselected signal from a remote transmitter (40) and generating a first detection signal in response thereto, first sensing means for sensing change in a preselected parameter of the handset, warning means (300) for generating a warning signal, alarm means (400) for generating an alarm signal and control means (500) responsive to receipt of the detection signal to activate the alarm means (400). The control means (500) is operable to activate the warning means in response to at least one of receipt of the control signal and sensing of the change in the preselected parameter of the handset.

15 Claims, 5 Drawing Sheets

(56) References Cited

U.S. PATENT DOCUMENTS

| | | | | | |
|---|---|---|---|---|---|
| 4,935,951 | A * | 6/1990 | Robinson et al. | ............... | 379/37 |
| 5,028,911 | A | 7/1991 | Wanat | | |
| 5,309,145 | A | 5/1994 | Branch | | |
| 5,687,228 | A | 11/1997 | Ellington, Jr. | | |
| 5,745,849 | A * | 4/1998 | Britton | ....................... | 455/404.1 |
| 5,774,038 | A | 6/1998 | Welch et al. | | |
| 5,786,760 | A | 7/1998 | Suzuki | | |
| 5,877,676 | A * | 3/1999 | Shankarappa | ............. | 340/309.7 |
| 5,917,887 | A | 6/1999 | Fesler et al. | | |
| 5,923,731 | A * | 7/1999 | McClure | ......................... | 379/33 |
| 6,154,130 | A | 11/2000 | Mondejar | | |
| 6,603,855 | B1 * | 8/2003 | Cannon et al. | ................ | 379/377 |
| 6,690,288 | B1 | 2/2004 | Waddell | | |
| 2002/0163428 | A1 * | 11/2002 | Weng | ............................ | 340/506 |
| 2002/0186141 | A1 | 12/2002 | Jen et al. | | |
| 2003/0212511 | A1 * | 11/2003 | Carle et al. | ...................... | 702/56 |
| 2004/0242283 | A1 | 12/2004 | Flores | | |
| 2005/0217965 | A1 | 10/2005 | Muranaka et al. | | |
| 2006/0158963 | A1 * | 7/2006 | O'Neill et al. | .................. | 368/46 |
| 2006/0193301 | A1 * | 8/2006 | Cheng et al. | .................. | 370/338 |

FOREIGN PATENT DOCUMENTS

| | | | |
|---|---|---|---|
| JP | 63178610 | A | 7/1988 |
| JP | 2002171311 | A | 6/2002 |
| JP | 2005282648 | A | 10/2005 |
| WO | 2004008732 | | 1/2004 |
| WO | 2004070673 | | 8/2004 |
| WO | 2005013222 | | 2/2005 |
| WO | 2006037339 | | 4/2006 |

OTHER PUBLICATIONS

UK Patent Office Search Report of Jul. 12, 2006 in related application GB0604336.8.

Office Action of 22-21-2013 from GB Patent Office in related EP application 07712831.2.

International Search Report in related PCT/GB2007/000761, filed Mar. 6, 2007.

Office Action of Sep. 16, 2013 in related Canadian patent application 2,645,534.

* cited by examiner

ALARM SYSTEM

This application is a US National Phase of International Application PCT/GB2007/000761 and claims priority under 35 U.S.C. §119(a)-(d) of Application No. GB0604336.8 filed on Mar. 6, 2006, which applications are hereby incorporated herein by reference in their entireties.

BACKGROUND

The present invention relates to an alarm system and particularly, but not exclusively, to an improved form of alarm system for detecting smoke, fire, carbon monoxide or other noxious gases.

The use of carbon monoxide, smoke and fire detectors in homes has become increasingly common. Some systems have a number of remote sounders which can be triggered to emit a warning sound when a remote base station detects the presence of fire, smoke, carbon monoxide or the like. Such a remote sounder has the advantage that it can be placed at the bedside of, for example, a child.

However, research has shown that children particularly can be difficult to wake and often when they are woken by an alarm the main electrical system of the building may have been damaged and be inoperative and the room or a building may be filled with an appreciable quantity of smoke. The effect is to disorientate the occupants who can then find it difficult to escape from a dark, smoke filled area. This problem can be exacerbated if the fire occurs after dark.

The present invention seeks to provide an improved alarm system.

Accordingly, the present invention provides an alarm system comprising: an alarm handset having: a housing; a detector circuit having means for receiving a preselected signal from a remote transmitter and generating a first detection signal in response thereto; first sensing means for sensing change in a preselected parameter of the handset; light generating means for generating visible light; alarm means for generating an alarm signal; and control means responsive to receipt of said detection signal to activate said alarm circuit; wherein said control means is further operable to activate said light generating means in response to receipt of said control signal and subsequent sensing of said change in said preselected parameter of the handset.

In a preferred form of the invention said preselected parameter comprises one of a preselected time period following receipt of said control signal; actuation of a switch; or movement of said handset.

Advantageously, said system further comprises: cradle means for supporting said handset; and wherein said first sensing means comprises means for sensing the presence or absence of said handset in said cradle; and said control means is operable to activate said light generating means in response to said first sensing means sensing subsequent removal of said handset from said cradle.

BRIEF DESCRIPTION OF THE DRAWINGS

The present invention is further described hereinafter, by way of example, with reference to the accompanying drawings, in which.

DETAILED DESCRIPTION

Figure 1:
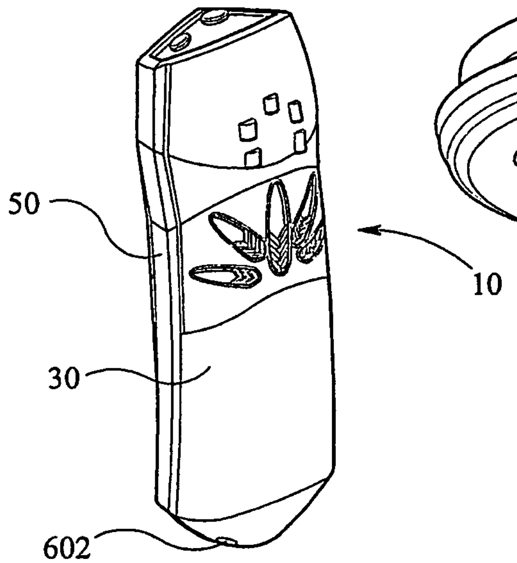
FIG. 1 is a perspective view of a preferred form of alarm handset according to the present invention.
Figure 1A:
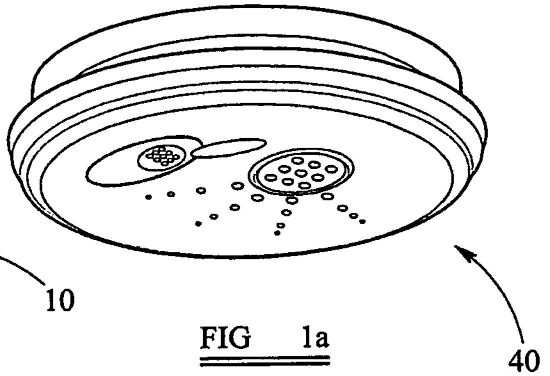
FIG. 1*a* is a perspective view of a base station or alarm for use with the handset of FIG. 1.

Referring to the drawings, FIG. 1 shows a portable handset 10 of a preferred form of alarm system according to the present invention and FIG. 1*a* shows a base station 40 for the handset.

Figure 2:
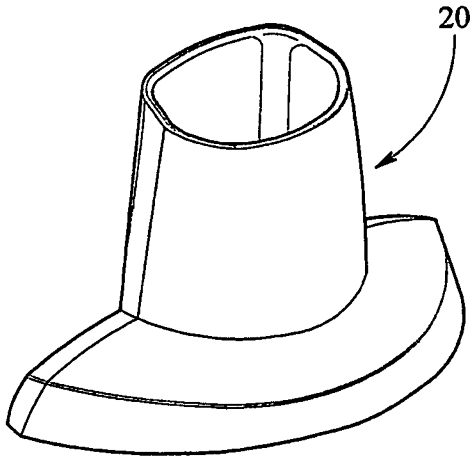
FIG. 2 is a perspective view of a cradle for the handset of FIG. 1.
Figure 2A:
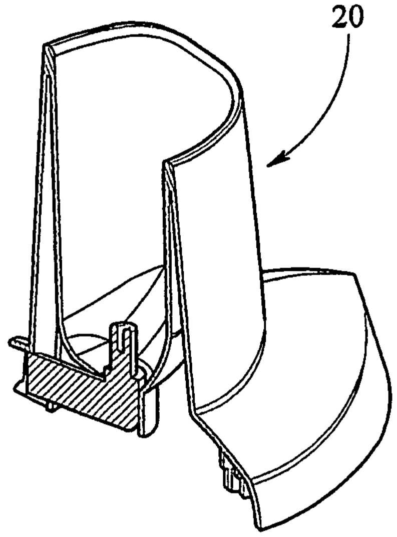
FIG. 2*a* is a perspective view of the cradle partially broken away to show the internal construction.

FIGS. 2 and 2*a* show a cradle 20 which supports the handset 10.

The cradle 20 has a power supply cable which connects the handset to mains 27 via a converter (which may be a transformer or other form of voltage reduction device) which serves to step down the mains supply to a suitable voltage and current which can be used to charge a rechargeable battery in the handset 10 by way of suitable electrical contacts in the handset which connect with co-operating contacts in the base of the handset 10 when the latter is supported in the cradle 20. This is a conventional arrangement which is used with, for example, portable telephones and will not be described further in detail.

Figure 3:
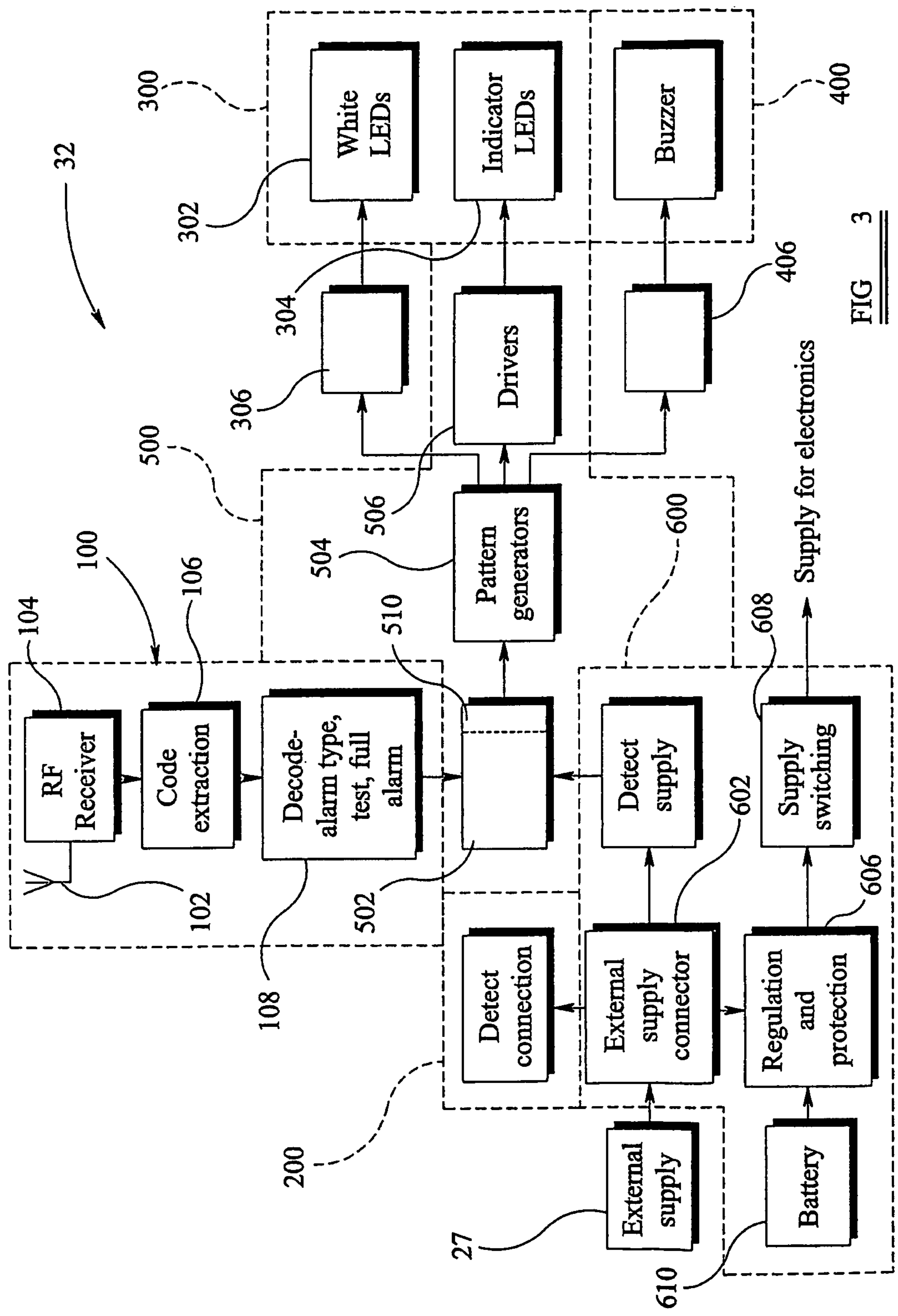
FIG. 3 is a block functional diagram illustrating the operation of the handset of FIG. 1.
Figure 4:
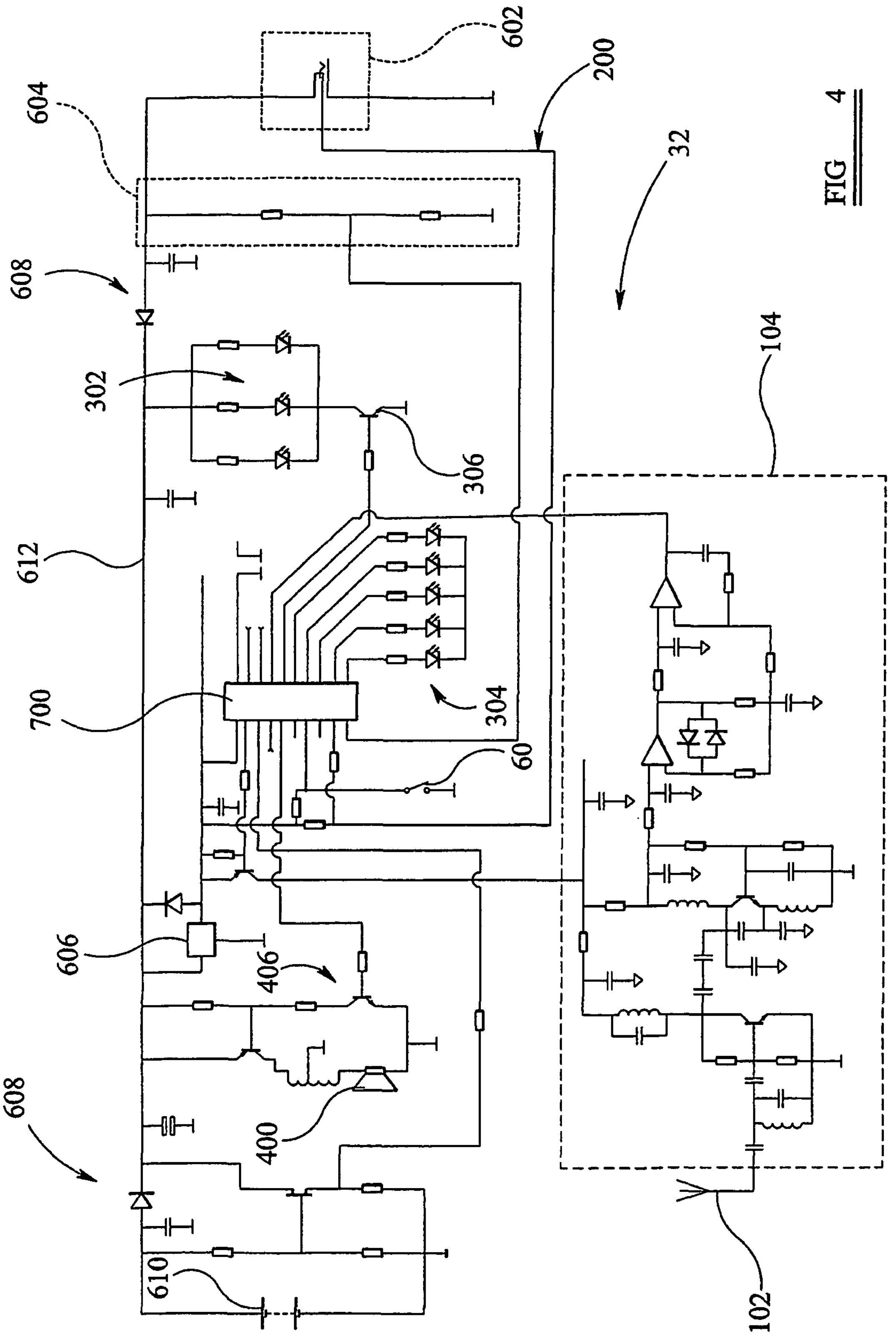
FIG. 4 is a schematic circuit diagram of the circuit of FIG. 3.

Referring now to the handset 10, this has a housing 30 which contains the main circuitry 32 as shown in FIGS. 3 and 4. FIG. 4 is a circuit diagram of the handset circuitry whilst FIG. 3 is a block function diagram showing the manner of operation of the handset.

The main circuitry 32 comprises a detector circuit 100, a sensing means or connection detect circuit 200, light generating means 300, alarm means 400 for generating an audible alarm signal, control means 500 for controlling the light generating means 300 and the alarm means 400 and a power supply circuit 600.

The handset 10 co-operates with a base station 40 which has a detector which detects radiation, noxious gases and/or air pollutants such as smoke, carbon monoxide and the like and in response to the detection generates a signal representative of the type of radiation and/or air pollutant which is detected and transmits the signal via a transmitter to the handset 10.

The handset 10 will normally be located in the cradle 20 and will receive the signal transmitted by the base station 40 through its detector circuit 100.

The detector circuit has an aerial 102 and an RF (radio frequency) receiver 104 which detects the transmitted signal and analyses the signal to determine whether or not it is from the base station 40.

If the signal is identified as a legitimate signal a code within the signal is extracted by a code extraction circuit 106. The code can be in the simple form of a pulse modulation signal by which the RF signal transmitted from the base station 40 has been modulated. The code is then passed to a code identification circuit 108 which compares the code with a number of previously stored codes to identify the code.

If a number of base stations 40 are used in proximity to one another each can be programmed to transmit a unique coded signal so that the code identification circuit 108 can identify the base station triggering the alarm. This is particularly useful in large buildings where the base station will identify the location of the cause of the alarm within the building. The code extraction circuit 106 can generate a pre-selected signal in response to the particular code of signal received from a base station and this signal can result in the audible alarm 400 indicator, LED's 304 and/or the white LED's 302 being energised in pre-selected patterns to provide an indication of the type of alarm that has occurred.

Each base station 40 can also be programmed to emit a unique coded signal in dependence on the type of radiation or pollution which is detected so that, again, the user of the handset can immediately identify the cause of the alarm.

It is also possible for the base stations to be programmed to transmit a further unique coded signal when the base stations are being tested and this signal again can identify to a user of the handset the fact that the alarm system is being tested and the alarm is not a genuine alarm. Once the code has been extracted from the received signal by the code extraction circuit 106 the code identification circuit then decodes to the code to provide an alarm signal representative of the type of alarm being generated by the system and this signal is then passed to the control circuit 500.

The code identification circuit 108 and the control circuit 500 are all part of a microprocessor 700 (FIG. 4) or the like.

The handset 10 has two power sources as can be identified by the power supply circuit 600.

The first power source is mains power as described earlier. The power supply circuit 600 has an external supply connector which is formed by contacts 602 formed on the base of the handset 10 and which connect with the corresponding connectors of the cradle 20 to connect to the external supply 27. When the handset 10 is mounted in the cradle 20 the sensing means 200 detects the electrical connection of the handset 10 with the cradle 20 and applies a sensing signal to an input circuit 502 of the microprocessor 700. Although the sensing of the mounting of the handset in the cradle 20 is conveniently by way of the power supply connections 602, it can also be effected by an suitable means such as a separate switch actuated when the handset is engaged into or removed from the cradle 20.

The power supply circuit 600 also has a power supply detection circuit 604 which detects the supply of power from the cradle 20 to the handset 10 by way of the connections 602. This occurs when the cradle 20 is connected to the external supply by way of the cable and converter and the detection circuit 604 applies a supply detection signal also to the input circuit 502 of the microprocessor 700. As can be seen from FIG. 4, the detection circuit 604 is conveniently simply a resistance divider which applies a voltage to an input of the microprocessor 700 when supply voltage is applied to supply line 612 of the main circuitry 32.

Power is also supplied from the supply connector 602 to a regulation and protection circuit 606 and by way of a supply switching circuit 608 (in the form of diodes) to provide the supply for the circuitry 32 of the handset 10.

The regulation and protection circuit 606 regulates the supply and provides protection for the handset circuitry against fluctuations and voltage surges or peaks in the mains supply, as well as connection of the wrong form of supply, e.g. ac or wrong polarity or voltage.

A battery 610 is also connected to the regulation and protection circuit 606 and supplies power for the handset circuitry 32 in the absence of the external supply. The battery can be a rechargeable battery which is recharged by the power supply circuit 600 when the external supply is connected.

The input circuit 502 of the microprocessor 700 receives the decoded alarm signal, the sensing signal and the supply detection signal and processes these to provide a control signal to the light generating means 300 and/or the audible alarm 400. The microprocessor 700 also has a pattern generator circuit 504 and drivers 506 for driving the indicator LED's 304. The audible alarm 400 and the white LED's 302 have their own drivers respectively 406, 306, which are controlled by the pattern generator circuit 504.

As can be seen from FIG. 3 the light generating means 300 has one or more white LEDs (light emitting diodes) 302 and indicator LEDs 304. The audible alarm 400 conveniently consists of a buzzer or other suitable means for generating an audible alarm signal.

The indicator LEDs 304 can comprise a number of different coloured LEDs e.g. green and red, which can be arranged to flash in various sequences as described further below.

When the base station 40 generates an alarm signal this is transmitted to the handset 10. The signal is then processed and decoded by the detector circuit 100 and the decoded alarm signal is applied to the input circuit 502 of the control circuit 500.

At the same time, the input circuit is also in receipt of a signal from the connection detect circuit 200 which indicates whether or not the handset is stored in its cradle 20.

If the signal received from the base station 40 indicates that the base station is being tested then the alarm signal from the identification circuit 108 is processed by the control circuit 500 to energise one or more of the indicator LEDs 304 in a preset pattern to indicate that the system is being tested. It is also possible in this situation for the control circuit to energise the audible alarm 400 at a relatively low level and in a preset pattern.

If the alarm signal applied to the control circuit 500 indicates that there is an alarm then the control circuit will energise the buzzer 400 to provide an audible alarm. In addition, the white LEDs 302 will be energised in a preselected sequence.

The audible alarm tone generated by the buzzer 400 will commence and increases over time to a maximum level. In one form of the invention the alarm tone is held at a first volume level for a first preselected time period, typically ten seconds. The volume level is then raised and the alarm continues for a further preselected time period, again typically ten seconds. This sequence continues with the volume of the alarm being increased at the end of each preselected time interval until the handset is removed from the cradle 20. At this point the signal supplied by the detect connection circuit 200 to the input circuit 502 changes, resulting in the audible alarm 400 being deactivated or the drive signal being changed to cause the audible alarm to emit a further, preselected sound pattern which is indicative of the fact that the handset has been removed from the cradle 20. The microprocessor 700 may also be programmed to issue voice commands or instructions after pick up of the handset 10 from the cradle. These could be, for example, instructions on how to evacuate the building. The audible alarm which is generated prior to pick up of the handset could also be a voice, which issues simple commands such as "fire", as increasing volume levels.

If the handset 10 remains in the cradle 20, the audible alarm 400 will continue to be sounded for a total period of four minutes. At this point, if there is no signal detected by the detector circuit 100 the system will reset.

Either the handset 10 or the cradle 20 could be connected to a vibration device (such as a vibration pillow) by suitable means such as a cable or radio signal. This can be controlled by the microprocessor 700 such that in addition to or as an alternative to the audible alarm 400 and/or the lights 302, 304 being energised, the vibration device could be energised to wake a sleeping person.

Figure 5:
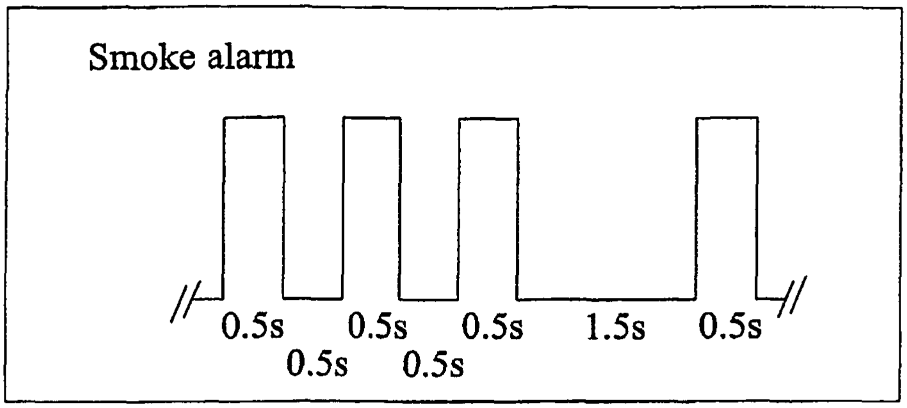
FIG. 5 is a first signal pattern for a first mode of operation of the system of FIG. 1.
Figure 6:
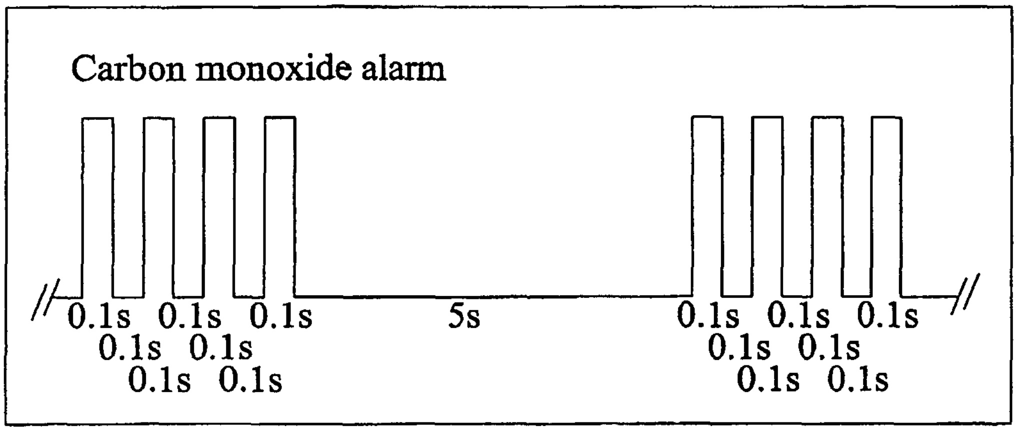
FIG. 6 is a second signal pattern for a second mode of operation of the system of FIG. 1.
Figure 7:
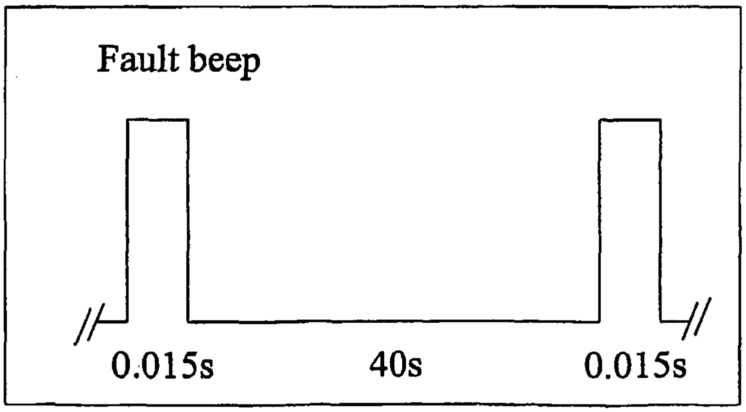
FIG. 7 is a third signal pattern for a third mode of operation of the system of FIG. 1.
Figure 8:
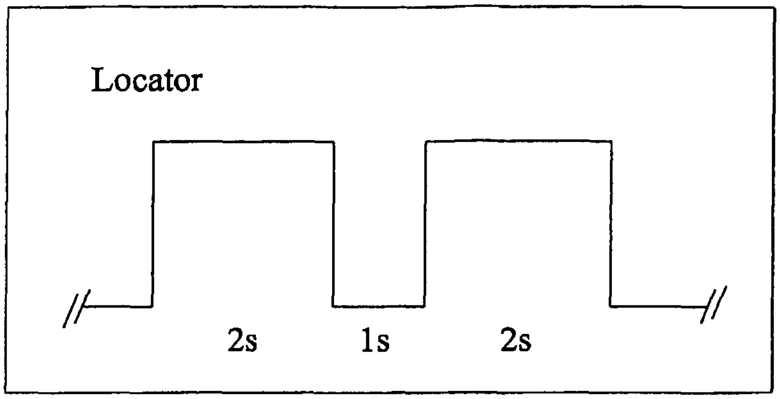
FIG. 8 is a fourth signal pattern for a fourth mode of operation of the system of FIG. 1.

The microprocessor 700 is programmed to energise the audible alarm 400 and light generating means 300 in preselected patterns in dependence on the type of signal received from the identification circuit 108. Thus, the energising of one or more of the audible alarm 400 and light generating means 300, can indicate the type of alarm being generated. It is also possible for the detector circuit 100 to receive several signals that runs from either a number of different base stations or the same base station which has detected several different alarm situations. For example, the base stations can monitor carbon monoxide levels and other noxious gasses, smoke and other particles in the air and radiated heat. It is also possible for one base station to detect one or more of these and transmit several different alarm signals.

Where the identification circuit 108 identifies two or more different alarm signals and applies these to the input circuit 502, the microprocessor can process the received signals to energise the audible alarm 400 and/or the light generating means 300 in a further preselected pattern, to indicate the fact that two or more alarm conditions exist. Alternatively, the microprocessor can be programmed to prioritise the alarms and identify which of the alarm signals received indicates the more dangerous alarm condition, and indicate this by suitable energising of the audible alarm 400 and/or light generating means 300. FIG. 5 shows a typical drive signal for the audible alarm 400 in which the alarm is pulsed on and off for 0.5 second periods with a 1.5 second pause between each group of pulses. This signal is typically used when the signal from the base station 40 indicates that the base station has detected smoke or excess heat which could indicate a fire.

Where the base station 40 detects carbon monoxide or other noxious gasses the driver signal applied to the audible alarm 400 is typically in the form shown in FIG. 6 with a much higher repetition frequency of 0.1 seconds on and 0.1 second off with a pause of 5 second between each group of pulses.

The colour or pattern of indicator LEDs 304 can also be varied to indicate the type of alarm.

When the handset 10 is removed from the cradle 20 after an alarm has been initiated, the sensor means 200 detects this and applies a corresponding signal to the input circuit 502. This cancels the alarm phase actuation of the buzzer (or alternatively causes actuation of the buzzer to generate a different, preselected sound pattern) 400 and causes energising of the white LEDs 302 which provide a "torch" function to enable the user to find his way through the building in the absence of any other lighting. The energising of the indicator LEDs 304 can also be cancelled at the same time.

It is advantageous to maintain the activation of the audible alarm 400 but at a set volume and energising or "locator" pattern since this acts as a "homing" signal or locator for the emergency services should the handset user be overcome or unable to find a way out of the building.

The indicator LEDs 304 can also provide an indication of the level of battery power available regardless of whether or not the handset 10 is removed from the cradle 20 or availability of the external power supply.

Figure 9:
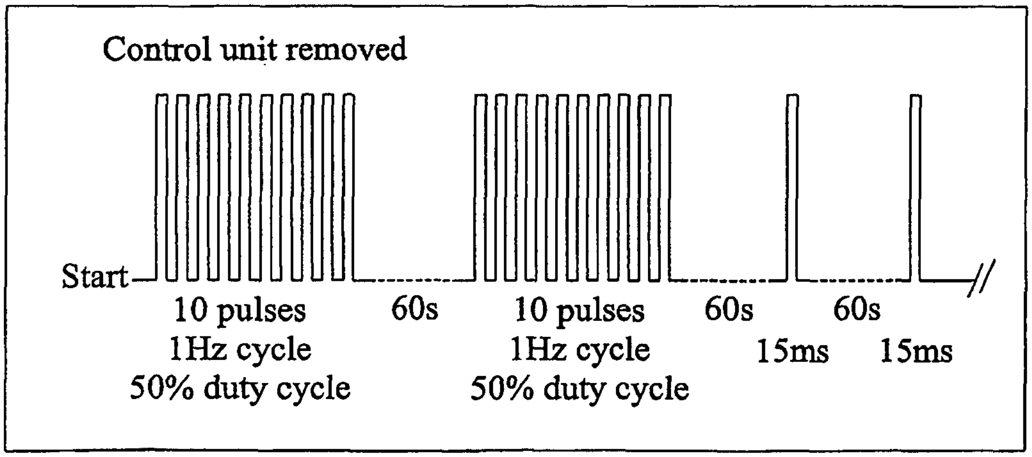
FIG. 9 is a fifth signal pattern for a fifth mode of operation of the system of FIG. 1.

If the handset 10 is removed from the cradle 20 in the absence of an alarm signal, the detect connection circuit 200 detects this removal and applies a signal representing this to the input circuit 502. The control circuit 500 then activate the buzzer 400 to generate a preselected sound pattern such as that shown in FIG. 9 to indicate that the handset 10 has been removed from its cradle 20. Return of the handset 10 to the cradle 20 cancels the signal.

In order to prevent unwanted tampering of the handset the control means may be configured, in the circumstance where no RF signal is received, to give only an audible alarm signal (no light) for several minutes when removed from the base until the handset is replaced. This is to stop the handset being used as a torch or a toy. If the handset is left out for a prolonged period of time it could be set to chirp periodically to alert someone but not completely discharge the battery (as it would in full alarm mode).

Alternatively, in the event the AC power fails the light on the handset could illuminate slightly (like a night light, so as not to awaken unnecessarily) and then on removal (again, in the event no RF signal is received) the handset becomes an emergency torch (i.e. full brightness).

The handset can also be programmed to enter a power save mode where the control circuit changes the polling of the alarm sensing to save power while still maintaining an acceptable reaction time. The microprocessor 502 can switch the circuit into "sleep" mode for a preset period of time before switching back to "wake" mode and checking to see if an alarm signal is received. If no signal is received the circuit is switched back into "sleep" mode for a further time period.

An LCD display (not shown) can also be provided on the handset to display information, typically non-critical information, such as a low battery indicator.

If the handset 10 is not fitted to its cradle when an alarm signal is received from the base station 40 the handset circuitry operates in the same way as if the handset were mounted in the cradle 20 but the audible alarm is activated by the control circuit 500 for a preset period of time following which it then switches the audible alarm 400 into a locating sound pattern and energises the white LEDs 302.

If, after an alarm is generated and the handset 10 removed from the cradle 20, the handset 10 is replaced in the cradle 20, the detect connection circuit 200 detects this and applies a signal to the input circuit 502. This results in the microprocessor cancelling the alarm signal applied to the energising of the buzzer 400 and white LEDs 302. If, however, an alarm signal is again detected by the detection circuit 100 the alarm will again be activated as described above.

The system can also be switched in to a "learn" state.

A "learn" switch 60 can be closed to connect a pin of the microprocessor 700 to ground. When the microprocessor detects this, it switches into a "learn" state for a preselected time period. When the handset is in its learning state, any alarm signal which is received by the receiver 104 is processed by the code extraction circuit 106. The extracted code is then stored in a memory or store 510 in the microprocessor 700.

The handset has two learning states, a full learning state and an incremental learning state.

The incremental learning state is initiated by pressing the learn switch 60 for a time period less than a pre-selected time, typically five seconds. This causes the control circuit 500 to generate a pre-selected light and/or audible pattern with the LED's 302, 304 or buzzer 400 to indicate that the handset is in its incremental learning state. The base unit 40 is then self-tested and generates a unique coded alarm signal, which is then detected by the handset, as described previously, and is stored in its memory 510. When the alarm signal is detected, the microprocessor generates a different visual and/or sound pattern to indicate that an alarm signal has been received and the code stored.

The handset then remains in the incremental learning state for a further pre-selected period of time. If no alarm signals are received from any further base units during that period, then the handset exits the incremental learning state. The incremental learning state can also be cancelled by returning the handset into its cradle 20.

When the handset receives the alarm signal, before storing the extracted code, this is compared with codes already stored in the microprocessor memory 510. If this shows that the relevant base station has already been identified and its unique alarm signal stored, the extracted code signal is ignored. To enter the full learning state, the learn switch 60 is held closed for longer than a pre-selected time period, again typically five seconds, following which the handset enters its full learning state. The microprocessor then energises one or more of the white LED's, indicator LED's and buzzer to indicate that the handset is in its full learning state. In this state, the microprocessor erases all of the previously stored signals in its memory 510 and generates a confirmation sound or beep from the buzzer 400 when it is ready to detect new base station alarm signals. The handset then proceeds to "learn" any new signals received in the same manner as in the incremental learning mode.

The control circuit 500 can also re-transmit any received alarm signals either by wire or wireless to enable the handset to act as a hub or gateway to other systems. The re-transmitted signal can also use a protocol such a Bluetooth, ZigBee or WiFi.

To encourage use of the handset by children, it may conveniently be combined with, for example, a mobile phone or MP3 player.

Whilst the use of the handset 10 has been described in combination with a cradle, the latter is not essential to the invention. Movement of the handset 10, i.e., when it is picked up after generating an alarm signal, can be detected by a movement sensor, which then causes the microprocessor to switch the handset into its alarm state, in which the white LED's 302 are energised at a constant light level and the audible alarm 400 is energised into the locating sound pattern.

The invention claimed is:

1. An alarm system comprising:

an alarm handset and a cradle configured to support the alarm handset such that the alarm handset is removable therefrom, the alarm handset comprising:

a housing;

a detector circuit configured to receive a predetermined signal, indicative of a detection of radiation, noxious gasses or air pollutants, from a transmitter that is remote from the alarm handset and cradle and configured to generate a detection signal in response thereto;

a first sensor configured to sense a removal of the alarm handset from the cradle;

a warning device comprising a light generating device and configured to generate a visible warning signal;

an alarm configured to generate an audible alarm signal; and a control circuit configured to activate the alarm upon receipt of the detection signal;

wherein the control circuit is further configured to activate the warning device in response to the removal of the alarm handset from the cradle.

2. The alarm system of claim 1, further comprising a vibrating device.

3. The alarm system of claim 1, wherein the control circuit is further configured to activate the light generating device such that the light generating device is usable as a torch.

4. The alarm system of claim 1, wherein the control circuit is further configured to receive the detection signal, to activate the alarm device to generate the audible alarm signal at a first, pre-selected level and to cause a volume of the audible alarm to increment to a second pre-set level over a pre-selected period of time.

5. The alarm system of claim 1, wherein the control circuit includes a memory for storing a plurality of alarm signals, and a circuit configured to compare the detection signal with the stored signals and energizing at least one of the alarm device and the warning device depending upon a result of the comparison.

6. The alarm system of claim 1, further comprising a docking station configured to provide power to the alarm handset.

7. The alarm system of claim 3, wherein the light generating device is configured to be automatically activated in response to the first sensor sensing a removal of the alarm handset from the cradle.

8. The alarm system of claim 1, wherein the control circuit is further configured to control the warning device in response to receipt of the detection signal.

9. The alarm system of claim 3, wherein the control circuit is further configured to:

activate the light generating device in a first mode of operation so as to generate a visible warning, and in response to a removal of the alarm handset from the cradle, operate the light generating device in a second mode of operation in which the light generating device acts as the torch.

10. The alarm system of claim 1, wherein the control circuit is further configured to change characteristics of the audible alarm signal to a selected volume and pattern to enable the alarm handset to be located in response to a removal of the alarm handset from the cradle.

11. The alarm system of claim 9 wherein the light generating device is configured to generate a constant beam of light in the second mode of operation.

12. The alarm system of claim 1, wherein the alarm handset comprises a microprocessor configured to enable voice commands or instructions to be issued in response to the removal of the alarm handset from the cradle.

13. The alarm system of claim 1, wherein the alarm handset further comprises a liquid crystal display (LCD) configured to display information.

14. The alarm system of claim 1, further comprising:

at least one base station comprising a detector configured to detect radiation, noxious gasses and/or air pollutants including smoke or carbon monoxide, and a transmitter configured to transmit the predetermined signal to the alarm handset in response to the detection of the radiation, noxious gasses and/or air pollutants.

15. The alarm system of claim 14, wherein the predetermined signal is indicative of a type of radiation and/or air pollutant detected.

* * * * *